United States Patent

Sato et al.

[11] Patent Number: 4,740,724
[45] Date of Patent: Apr. 26, 1988

[54] SUPERCONDUCTING GENERATOR ROTOR

[75] Inventors: Kazuo Sato, Ebina; Masanori Arata, Tokyo; Mikio Kumagai, Chigasaki, all of Japan

[73] Assignee: Kabushiki Kaisha Toshiba, Kanagawa, Japan

[21] Appl. No.: 63,502

[22] Filed: Jun. 18, 1987

[30] Foreign Application Priority Data

Jul. 3, 1986 [JP] Japan ............... 61-155064

[51] Int. Cl.⁴ ............................................. H02K 9/20
[52] U.S. Cl. ........................................ 310/52; 310/43; 310/61; 310/71
[58] Field of Search ................ 310/10, 40, 43, 45, 310/52, 54, 61, 64, 71, 214, 216

[56] References Cited

U.S. PATENT DOCUMENTS 3,955,111  5/1976  Weghaupt ............... 310/54
4,146,804  3/1979  Carr, Jr. ................. 310/52

Primary Examiner—Patrick R. Salce
Assistant Examiner—D. L. Rebsch
Attorney, Agent, or Firm—Schwartz, Jeffery, Schwaab, Mack, Blumenthal & Evans

[57] ABSTRACT

A superconducting generator rotor which has a superconducting field coil cooled by liquid helium. The evaporated gas helium is utilized to cool the electric lead which leads electricity to the field coil. The gas helium is then confined in a coolant flow passage made of electrical insulation material. With this rotor, electrical discharge is avoided even when high voltage appears through introduction of excitation control.

7 Claims, 5 Drawing Sheets

SUPERCONDUCTING GENERATOR ROTOR

BACKGROUND OF THE INVENTION

1. Field of the Invention

This invention relates generally to a superconducting generator rotor, and more particularly to a generator rotor to which liquid helium is supplied to keep the superconducting field coil cold.

2. Description of the Prior Art

Superconducting generator rotors which use superconducting coils are being developed to raise the efficiency of the generator employing the rotors. The superconducting coils are soaked in liquid helium in the rotors and kept about 40° K.

In order to restrict the heat flow from the atmosphere into the liquid helium in such a rotor and to reduce the evaporation rate of the liquid helium, the rotor has an inner rotor, an outer rotor and vacuum layers between them, as shown in FIG. 1 in page 27 of *IEEE Transactions on Energy Conservation*, Vol. EC-1, No. 3. Furthermore, the cold evaporated gas helium is used to cool the electric lead which leads to the superconducting coil through thr rotor shaft to reduce the heat conduction through the electric lead.

In the prior art, the electric lead to the superconducting coil terminates in a free end which faces the structure of the rotor, which is at the ground voltage level and directs the gas helium toward this structure, as shown in FIG. 2 (*a*) in page 218 of the above-mentioned reference and reproduced in FIG. 1 of this application. Since the electric lead voltage is as low as 10 V, there is no need for protection against discharging through the gas helium.

Referring to FIG. 1, the superconducting generator rotor according to the prior art will be described in more detail. This rotor has a superconducting coil (not shown) which is cooled by liquid helium. Evaporated gas helium returning from the coil is guided through a coolant path 10 which is a hole in a hollow electric lead 12. The electric lead 12 has a distal end which connects to the superconducting coil. A connector 14 connects the near end of lead 12 to a first collector ring 16. The first collector ring 16 is attached to the outer surface of a main shaft 18 which supports the whole generator rotor, and the first collector ring 16 is kept in contact with a brush (not shown) through which electricity is supplied. The electric lead 12 is cooled by the gas helium flowing through it, and the electric lead 12 is covered with an electric insulator 20.

A second collector ring 22 is attached to and electrically connected to the main shaft 18. The second collector ring 22 is kept in contact with a brush (not shown) which is connected to the ground level electrode, and the main shaft 18 is kept at the ground level voltage.

The gas helium flows out of the coolant path 10 in the electric lead 12, flows into a cavity 24 formed in the main shaft 18 and is guided axially away from the superconducting coil to a helium transfer coupling (not shown).

In the cavity 24, helium feeding/exhausting pipes 26 which are at ground level voltage, the main shaft 18, the electric lead 12, and the connector 14 are exposed to the gas helium, although part of the main shaft 18 in the cavity 24 is covered with an electric insulator 28.

In the prior art, excitation control is not applied to the superconducting generators because their internal reactance is low, and consequently, their stability is high.

If excitation control is applied to the superconducting generators, their stability increases further. However, in this case, electric current in the field coil changes rapidly, and the voltage at the first collector ring 16 reaches the kV range or may be as high as tens of kV. When the voltage reaches such a high value, electric discharge would occur through the gas helium in the cavity 24 in the main shaft 18. Such discharge is predicted by the discharge characteristic curve for 200°–300° K. shown in FIG. 2, which is reproduced from page 36 of Denki Gakai Gijyutsu Hoh, Part II, Vol. 93.

SUMMARY OF THE INVENTION

An object of this invention is to prevent electrical damage in a superconducting generator rotor even when excitation control is applied and a high voltage appears. According to the invention there is provided a superconducting generator rotor comprising an inner rotor containing liquid helium; a superconducting coil soaked in the liquid helium in the inner rotor; means for supplying liquid helium to the inner rotor; a main shaft with a cavity for coaxially supporting the inner rotor, wherein the main shaft is adapted to be electrically connected to ground; a collector ring fixed to and electrically insulated from the main shaft, wherein the collector ring is adapted to be in sliding contact with an electrode; an electric lead, axially penetrating but electrically insulated from the main shaft, for leading electricity to the superconducting coil; a connector for electrically connecting the collecting ring and the electric lead; means for cooling the electric lead utilizing gas helium evaporated in the inner rotor; and means for confining the gas helium utilized for cooling the electric lead in a coolant flow passage made of electrical insulation material in the cavity in the main shaft, so as to avoid electric damage through the gas helium between the connector and the main shaft.

Further objects, features and advantages of the present invention will become apparent from the detailed description of the preferred embodiments' that follows, when considered with the attached drawings.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DETAILED DESCRIPTION OF THE PREFERRED EMBODIMENTS

Figure 1:
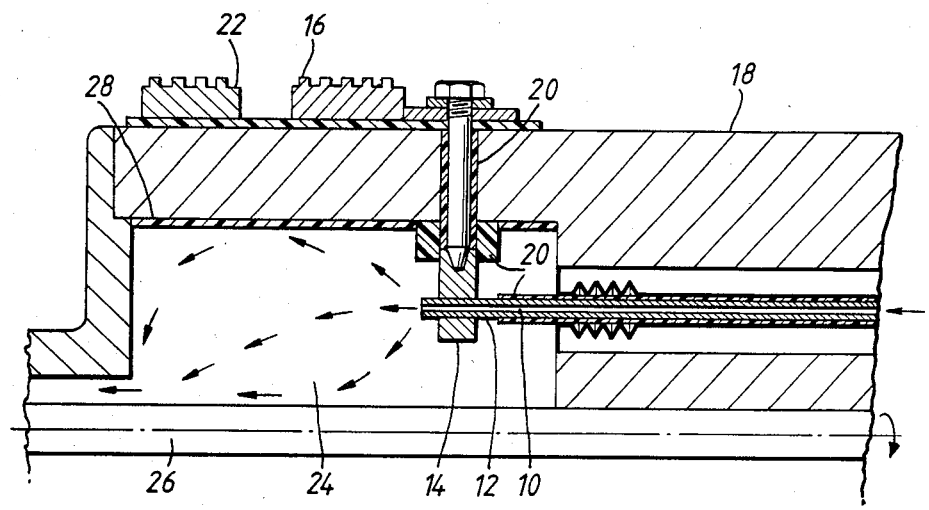
FIG. 1 is an axial cross-sectional view of the essential part of a superconducting generator rotor of the prior art.
Figure 2:
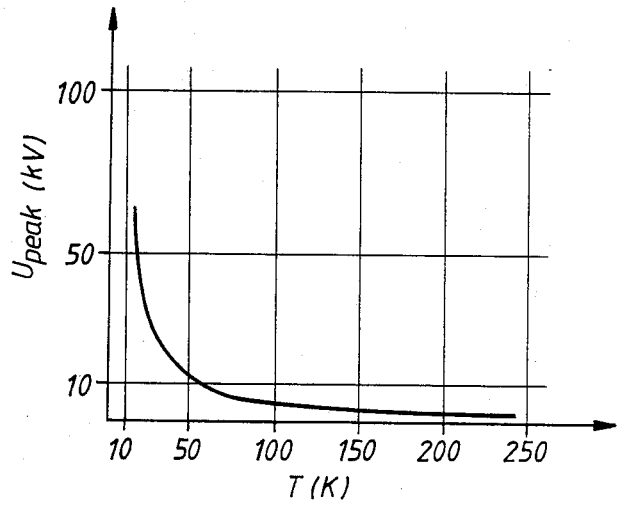
FIG. 2 is a characteristic diagram of electrical discharging peak voltage versus temperature of gas helium for 50 Hz AC voltage.
Figure 3:
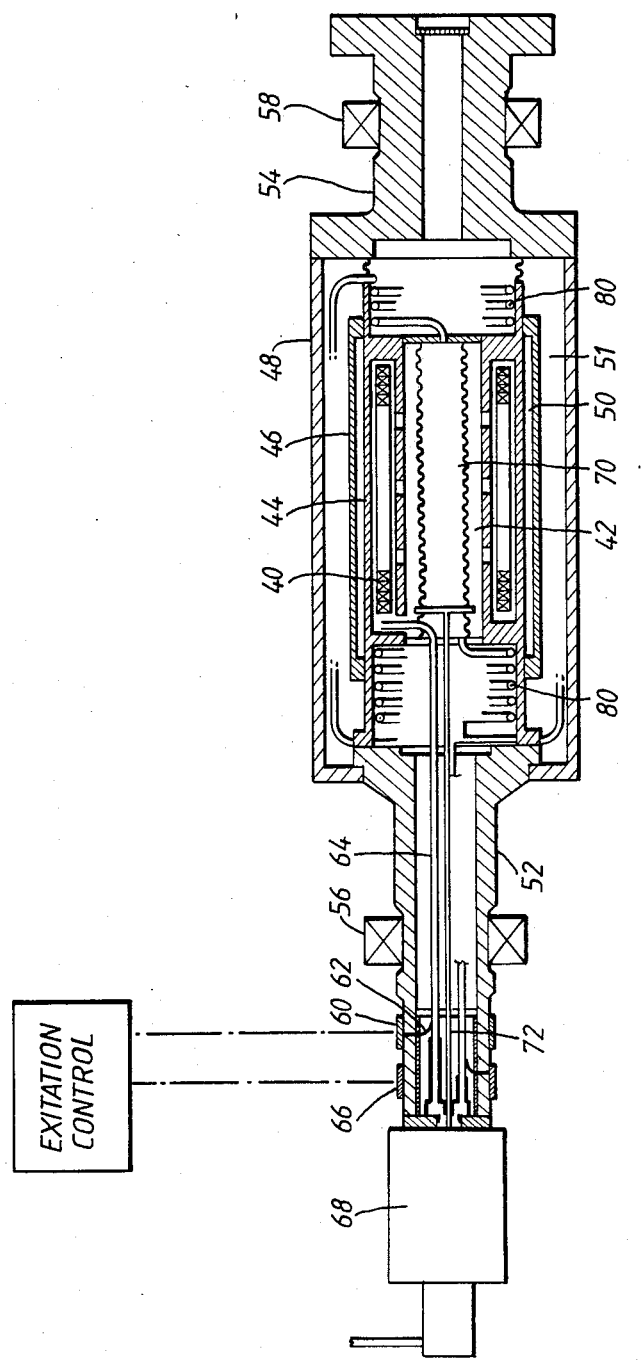
FIG. 3 is an axial cross-sectional view of a first embodiment of a superconducting generator rotor of this invention.

Referring to FIG. 3, a superconducting generator rotor according to the present invention is shown. This superconducting generator rotor has a superconducting field coil 40 soaked in liquid helium 42 contained in an inner rotor 44. The inner rotor 44 is coaxially surrounded by a radiation shield 46 and an outer rotor 48. There are vacuum layers 50 and 51 surrounding the inner rotor 44 and the radiation shield 46, respectively, to prevent heat leakage.

Both ends of the outer rotor 48 are supported coaxially by hollow main shafts 52 and 54. The main shafts 52 and 54 are rotatably supported by bearings 56 and 58, respectively.

Figure 4:
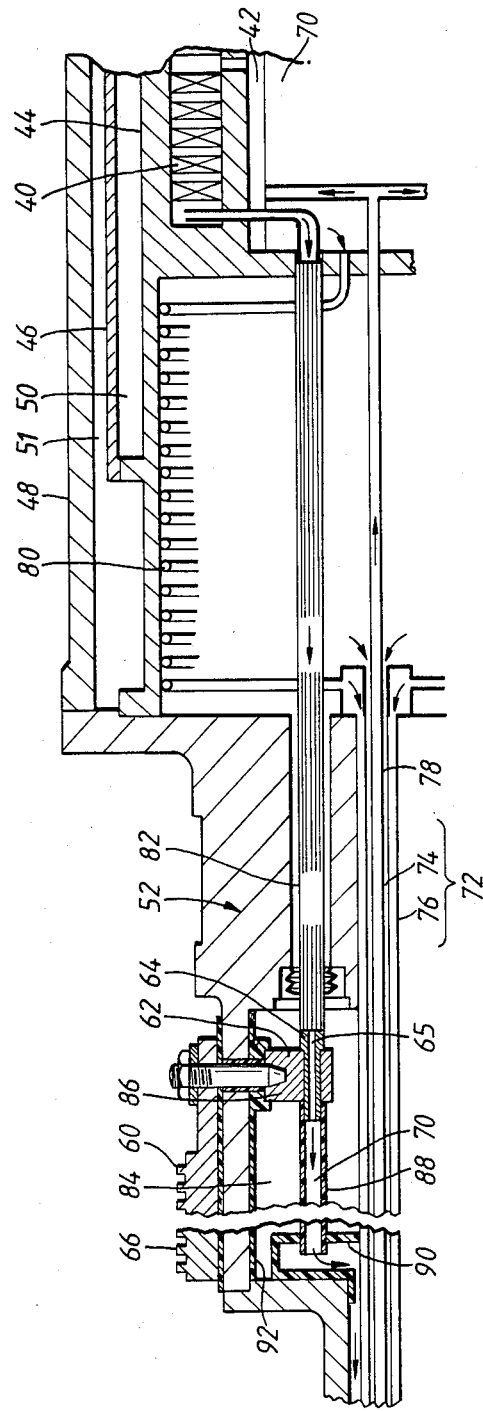
FIG. 4 is an enlarged axial cross-sectional view of the essential part of the superconducting generator rotor shown in FIG. 3.

A first collector ring 60, which is in sliding contact with a brush connected to a high voltage electrode (not shown), is mounted on the main shaft 52. The first collector ring 60 is connected with the field coil 40 via a connector 62 and an electric lead 64 with a coolant path 65 in it, as shown in FIG. 4.

A second collector ring 66, which is in sliding contact with a brush connected to a ground level electrode (not shown) is mounted on the main shaft 52.

A helium transfer coupling 68, through which liquid helium 42 is supplied to the inner rotor 44 and the evaporated gas helium 70 is exhausted for recycling, is rotatably attached to the end of the main shaft 52. The liquid helium 42 induced from the helium transfer coupling 68 is guided to the inner rotor 44 through a double coolant pipe 72 in the main shaft 52. The double coolant pipe 72 consists of a metal inner pipe 74 through which the liquid helium 42 flows and an outer metal pipe 76, forming an annulus path 78, as shown in FIG. 4.

The liquid helium 42 evaporates in the inner rotor 44 due to heat flows from outside. Some part of the evaporated gas helium 70 is guided to the annulus path 78 to minimize heat flow into the inner pipe 74, and some other part is guided to the coolant path 65 in the electric lead 64 to cool the electric lead 64. And some other part of the gas helium 70 is guided to heat exchanger 80 at both ends of the inner rotor 44 to minimize heat flow into the inner rotor 44 by heat conduction.

All of the gas helium 70 is guided to the helium transfer coupling 68 in the end.

Referring to FIG. 4, the electric lead 64 is covered with an insulation sheath 82. The main shaft 52 has a cavity 84 near the end, where the connector 62 penetrates the main shaft 52 radially, and electrically connects the electric lead 62 and the first collector ring 60.

The connector 62 and the collector ring 60 are electrically insulated from the main shaft 52 with insulators 86.

The coolant path 65 in the electrc lead 64 is connected to a coolant pipe 88 and then to a coolant chamber 90. The coolant pipe 88 and the coolant chamber 90 are made of electrical insulation material which is durable to a temperature as low as 170° K. Suitable insulation materials include polytetrafluoroethylene or ceramics.

The gas helium 70 guided through the coolant path 65, the coolant pipe 88 and the coolant chamber 90, is then guided to the helium transfer coupling 68 shown in FIG. 3. The coolant pipe 88 is long enough to prevent electric discharge through the gas helium 70 in the axial direction between the connector 62 and the main shaft 52 or between the connector 62 and the double coolant pipe 72 downstream of the coolant chamber 90. Part of the inner surface of the cavity 84 is covered by an insulation layer 92. The cavity 84, which is outside of the coolant pipe 88 and the coolant chamber 90, is filled with atmospheric pressure air.

In this embodiment, electric discharge through the gas helium 70 is prevented, even when the applied voltage to the field coil 40 is as high as tens of kV. Therefore, excitation control can be applied to the superconducting generator rotor.

Figure 5:
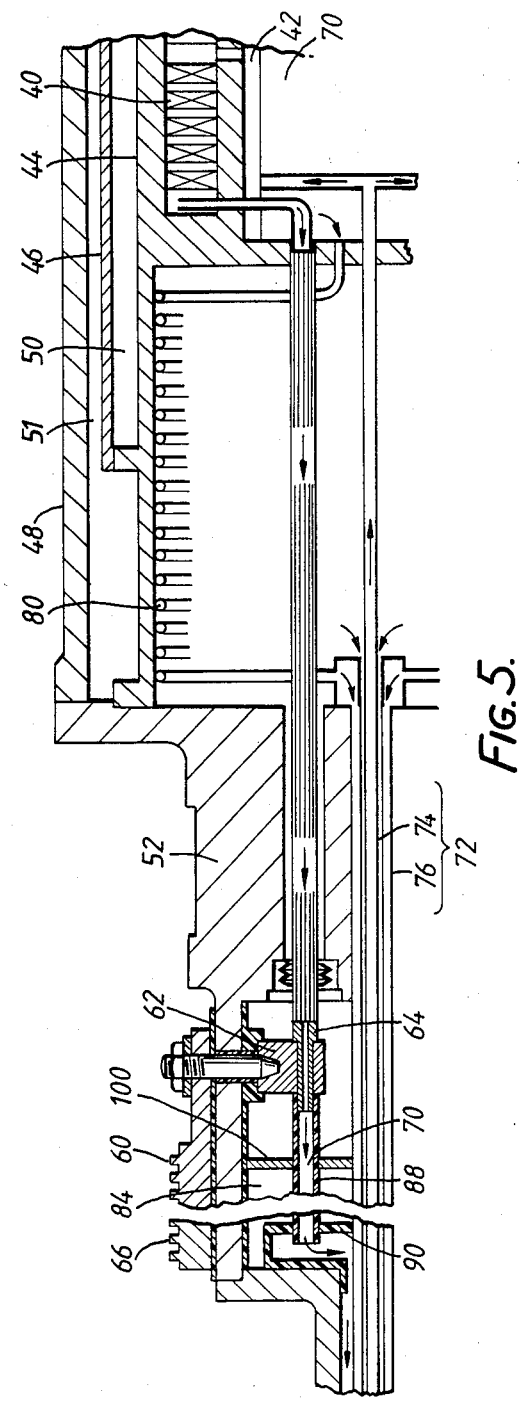
FIG. 5 is an axial cross-sectional view of the essential part of a second embodiment of this invention.

As for a second embodiment, there may be a spacer 100 in the cavity 84, which supports the coolant pipe 88 against the centrifugal force of the coolant pipe 88, as shown in FIG. 5.

Figure 6:
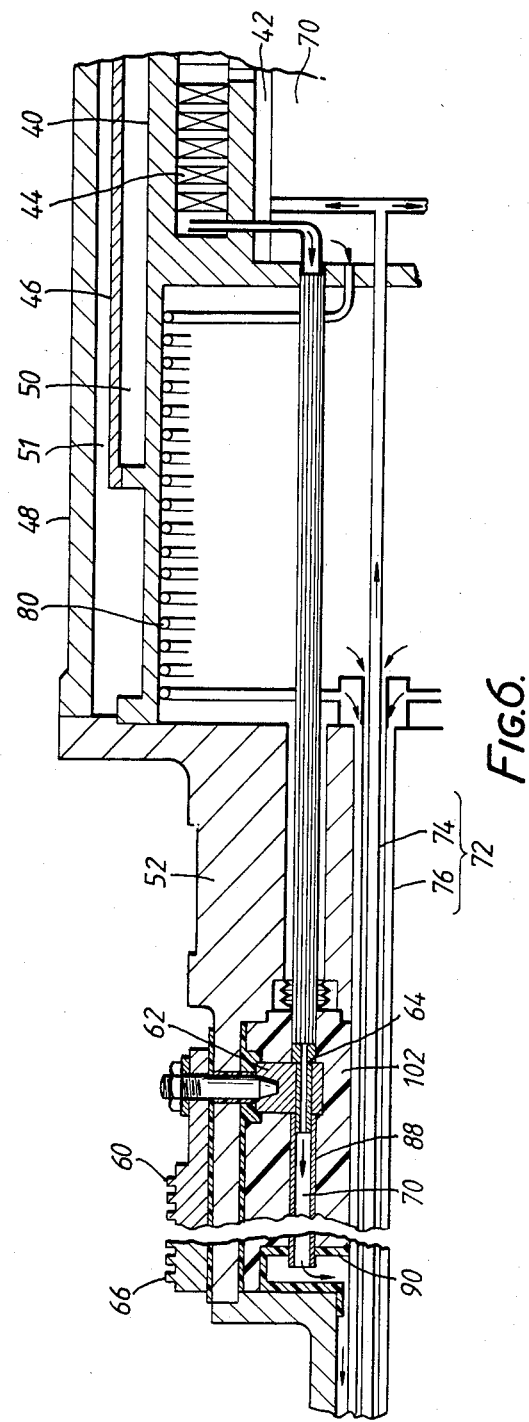
FIG. 6 is an axial cross-sectional view of the essential part of a third embodiment of this invention.

As for a third embodiment, the cavity 84 may be filled with insulation filler 102 made of electrical insulation material such as silicon rubber or epoxi-resin, as shown in FIG. 6. In this embodiment, the leakage of gas helium 70 into the cavity 84 is prevented, even if the coolant pipe 88 or the coolant chamber 90 has a defect.

The foregoing description has been set forth merely to illustrate preferred embodiments of the inventin and is not intended to be limiting. Since modification of the described embodiments incorporating the spirit and substance fo the invention may occur to persons skilled in the art, the scope of the invention should be limited solely with respect to the appended claims and equivalents.

What is claimed is:

1. A superconducting generator rotor comprising:
   an inner rotor containing liquid helium;
   a superconducting coil soaked in the liquid helium in the inner rotor;
   means for supplying liquid helium to the inner rotor;
   a main shaft with a cavity for coaxially supporting the inner rotor, wherein the main shaft is adapted to be electrically connected to ground;
   a collector ring fixed to and electrically insulated from the main shaft, wherein the collector ring is adapted to be in sliding contact with an electrode;
   an electric lead, axially penetrating but electrically insulated from the main shaft, for leading electricity to the superconducting coil;
   a connector for electrically connecting the collecting ring and the electric lead;
   means for cooling the electric lead utilizing gas helium evaporated in the inner rotor; and
   means for confining the gas helium utilized for cooling the electric lead in a coolant flow passage made of electrical insulation material in the cavity in the main shaft, so as to avoid electric discharge through the gas helium between the connector and the main shaft.

2. A superconducting generator rotor according to claim 1, wherein the said means for confining gas helium utilizing for cooling the electric lead comprises a coolant pipe made of electrical insulation material in the cavity in the main shaft.

3. A superconducting generator rotor according to claim 2, comprising a spacer for supporting the coolant pipe to the main shaft.

4. A superconducting generator rotor according to claim 2, comprising insulation filler filling at least part of the cavity in the main shaft.

5. An apparatus comprising:
   a superconducting generating rotor comprising:
      a housing:

a superconducting generator coil mounted in said housing;

helium contained in said housing, said helium including liquid helium surrounding said coil and gas helium evaporated from said liquid helium;

means for supplying said liquid helium to said coil;

an electric lead connected to said coil; and means for removing said gas helium from said coil, said removing means including means for confining gas helium next to said electric lead to cool said electric lead, and means for electrically insulating said gas helium from said housing to prevent electrical discharge between said electrical lead and said housing through said gas helium; and means for applying excitation control to said coil, including means for raising said coil and said lead to a potential or more than 1 kV.

6. An apparatus according to claim 5, wherein said confining means comprises a channel formed in said electrical lead, and said electrically insulating means comprises an insulated pipe connected to an end of said electrical lead to channel said helium gas away from said electrical lead.

7. An apparatus according to claim 5, wherein said electrically insulating means comprises an insulated pipe extending from said electrical lead and an electrical insulated chamber connected to said insulated pipe.

* * * * *